United States Patent
Taratino et al.

(10) Patent No.: US 7,328,173 B2
(45) Date of Patent: Feb. 5, 2008

(54) AUTOMATED PRINTING SYSTEM FOR PRODUCING COPYRIGHT PROTECTED IMAGE-BASED PRODUCT

(75) Inventors: Paul D. Taratino, Santa Cruz, CA (US); Lance Dildine, San Francisco, CA (US); Patrick Teo, San Mateo, CA (US); Su Quek, San Francisco, CA (US)

(73) Assignee: Shutterfly, Inc., Redwood City, CA (US)

( * ) Notice: Subject to any disclaimer, the term of this patent is extended or adjusted under 35 U.S.C. 154(b) by 582 days.

(21) Appl. No.: 10/465,185

(22) Filed: Jun. 19, 2003

(65) Prior Publication Data

US 2004/0260614 A1 Dec. 23, 2004

(51) Int. Cl.
*G06F 30/00* (2006.01)

(52) U.S. Cl. .......................................... 705/26; 705/27
(58) Field of Classification Search ................ 713/201, 713/193; 705/26, 27
See application file for complete search history.

(56) References Cited

U.S. PATENT DOCUMENTS

| | | | |
|---|---|---|---|
| 5,825,883 A | 10/1998 | Archibald | |
| 6,133,985 A | 10/2000 | Garginkle | |
| 6,209,097 B1 * | 3/2001 | Nakayama | 713/193 |
| 6,321,231 B1 | 11/2001 | Jebens | |
| 6,332,146 B1 | 12/2001 | Jebens | |
| 6,353,892 B2 * | 3/2002 | Schreiber | 713/201 |
| 6,915,273 B1 * | 7/2005 | Parulski | 705/26 |
| 7,133,846 B1 * | 11/2006 | Ginter et al. | 705/54 |
| 2002/0138440 A1 * | 9/2002 | Vaidyanathan et al. | 705/54 |

* cited by examiner

*Primary Examiner*—Mark Fadok
(74) *Attorney, Agent, or Firm*—Xin Wen

(57) ABSTRACT

An automated printing system for producing an image-based product comprises a server computer that receives from a first user a group of one or more copyright protected digital images and price information for image-based product. The price information can be distinct for each group of copyright protected digital images. The automated printing system also includes a computer processor that processes the copyright protected digital images in response to an order from a second user and calculates payment to the first user based on the price information and a digital printer that produces the image-based product in response to the processed copyright protected digital image.

15 Claims, 7 Drawing Sheets

Fig.4a

Welcome Vince    My Shutterfly | Sign out | Help shutterfly

Shutterfly Pro Galleries | Edit gallery info

Fields with an asterisk (*) are required

Name this gallery:
Gallery name: * [weddings]
Please use letters and numbers only, no spaces Example:
http://www.shutterfly.com/pro/AccountName/GalleryName/AlbumName You can be more descriptive with the gallery title and description.

Gallery title: * [Vince Tarry Wedding Photogr]
Gallery description: [2003 Weddings by Vince Tarry]

Enter a password if you want to password protect this gallery
Password: [cheese]

Save now    ⊗ Cancel

Set prices for this gallery
4x6: * $[5.00]   (min. $0.49)
5x7: * $[6.00]   (min. $0.99)
8x10: * $[9.00]   (min. $3.99)
Wallet: * $[12.00]   (min. $1.79)
11x14: * $[18.00]   (min. $7.99)
16x20: * $[41.00]   (min. $17.99)
20x30: * $[52.00]   (min. $22.99)

Save now

Fig. 4b shutterfly

Welcome Vince    My Shutterfly | Sign out | Help

Shutterfly Pro Galleries    ⊙ view all galleries

Gallery information:
Vince Terry Wedding Photography http://www.shutterfly.com/pro/vterry/Weddings ⊙ Add more albums
○ Edit gallery info Print prices

| Size | Price |
|---|---|
| 4x6 | $5.00 |
| 5x7 | $6.00 |
| Wallets (4) | $12.00 |
| 8x10 | $9.00 |
| 11x14 | $18.00 |
| 16x20 | $41.00 |
| 20x30 | $52.00 |

ALBUMS

April and Troy
Caesars Palace in Vegas
remove | edit album info

Jake and Shannon
remove | edit album info

Jill and JJ
remove | edit album info

AUTOMATED PRINTING SYSTEM FOR PRODUCING COPYRIGHT PROTECTED IMAGE-BASED PRODUCT

The present invention is related to commonly assigned U.S. patent application Ser. No. 09/436,704, filed on Nov. 9, 1999, titled "Distributing Images to Multiple Recipients", U.S. patent application Ser. No. 09/450,075, filed on Oct. 27, 1999, titled "Printing Images in an Optimized Manner", U.S. patent application Ser. No. 09/721,484, filed on Nov. 22, 2000, titled "User Interface and Methods for On-line Print Service", U.S. patent application Ser. No. 09/450,804, filed on Nov. 29, 1999, titled "Image Uploading", U.S. patent application Ser. No. 09/560,609, filed on Apr. 28, 2000, titled "System and Method of Providing a User Interface for Changing Attributes of an Image-based Product", U.S. patent application Ser. No. 09/561,027, filed on Apr. 28, 2000, titled "System and Method of Cropping an Image", U.S. patent application Ser. No. 09/684,595, filed on Oct. 5, 2000, titled "Previewing a framed image print", U.S. patent application Ser. No. 9/972,602, filed on Oct. 5, 2000, titled "Managing and searching digital images", U.S. patent application Ser. No. 10/106,902, filed on Mar. 25, 2002, titled "Producing and sharing personalized photo calendar", U.S. patent application Ser. No. 10/185,862, filed Jun. 28, 2002, titled "Personalized photo greeting cards", U.S. patent application Ser. No. 10/287,279, filed Nov. 3, 2002, titled "Producing personalized photo calendar", and U.S. patent application Ser. No. 10/335,472, filed Dec. 31, 2002, titled "Automated copyright detection in digital images". The disclosures of these related applications are incorporated herein by reference.

TECHNICAL FIELD

This application relates to providing image-based products based on copyright protected digital images.

BACKGROUND

Advancement in digital imaging technologies has provided consumers with unprecedented capabilities in capturing, editing, and manipulating digital images, and in reproducing the digital images on hardcopies. Inexpensive imaging hardware and software allow ordinary consumers to digitize images from photographic prints or photographic films, store the digital images in computer memory, manipulate and edit the digital images, and reproduce the digital images using digital printers at home. Home digital printers are now of such high resolutions and high bit-depths that consumers can produce hardcopy images at photographic quality levels.

The ubiquitousness of these capabilities, however, has posed a challenge to professional photographers. On one hand, the professional photographers need to promote his or her copyrighted digital images to many potential customers to generate sales. The promotion and the sales of the copyrighted digital images are preferrably low-cost, convenient, and flexible so the professional photographers can save time for creating his or her copyrighted photo work. On the other hand, the professional photographer have the need to control the reproduction of the copyrighted digital images. There is therefore a need for a low-cost, convinient, and flexible system for professional photographers to print and distribute their copyrighted digital image products.

SUMMARY

An automated printing system for producing copyright-protected image-based product is disclosed. In one aspect, the automated printing system for producing an image-based product comprises a server computer that receives from a first user a group of one or more copyright protected digital images and price information for the image-based product. The price information can be distinct for each group of copyright protected digital images and. The automated printing system also includes a computer processor that processes the copyright protected digital images in response to an order from a second user and calculates payment to the first user based on the price information and a digital printer that produces the image-based product in response to the processed copyright protected digital image.

In another aspect of the present invention, an automated printing system for producing an image-based product is provided, comprising a server computer that receives from a first user a group of one or more copyright protected digital images, a design for the image-based product, and distinct price information for each group of copyright protected digital images and the image-based product. The automated printing system further includes a computer processor that processes the copyright protected digital images in accordance to the design of the image-base product in response to an order from a second user and calculates payment to the first user based on the price information and a digital printer that produces the image-based product in response to the processed copyright protected digital image.

The automated printing system provided in the present invention is low-cost and convenient to the professional photographers and their customers for producing and distributing copyrighted image-based products. The professional photographers can organize the copyrighted digital images from different photo events in different photo galleries for different events or customers and can share the copyrighted digital images with their customers with minimal risks for losing control of their copyrights. The presentation and distribution of image-based products based their copyrighted digital images can be implemented without significant capital investment in network equipment, image storage and digital printing equipment. Another advantage of the present invention is that the automated printing system allows a professional photographer to flexibly set distinct prices for image-based products for each photo event. Yet another advantage of the present invention is that the professional photographers can customize the designs of image-based products and have the designs saved and conveniently distributed to their customers.

The details of one or more embodiments are set forth in the accompanying drawings and in the description below. Other features, objects, and advantages of the invention will become apparent from the description and drawings, and from the claims.

DRAWING DESCRIPTIONS

Figure 4C:
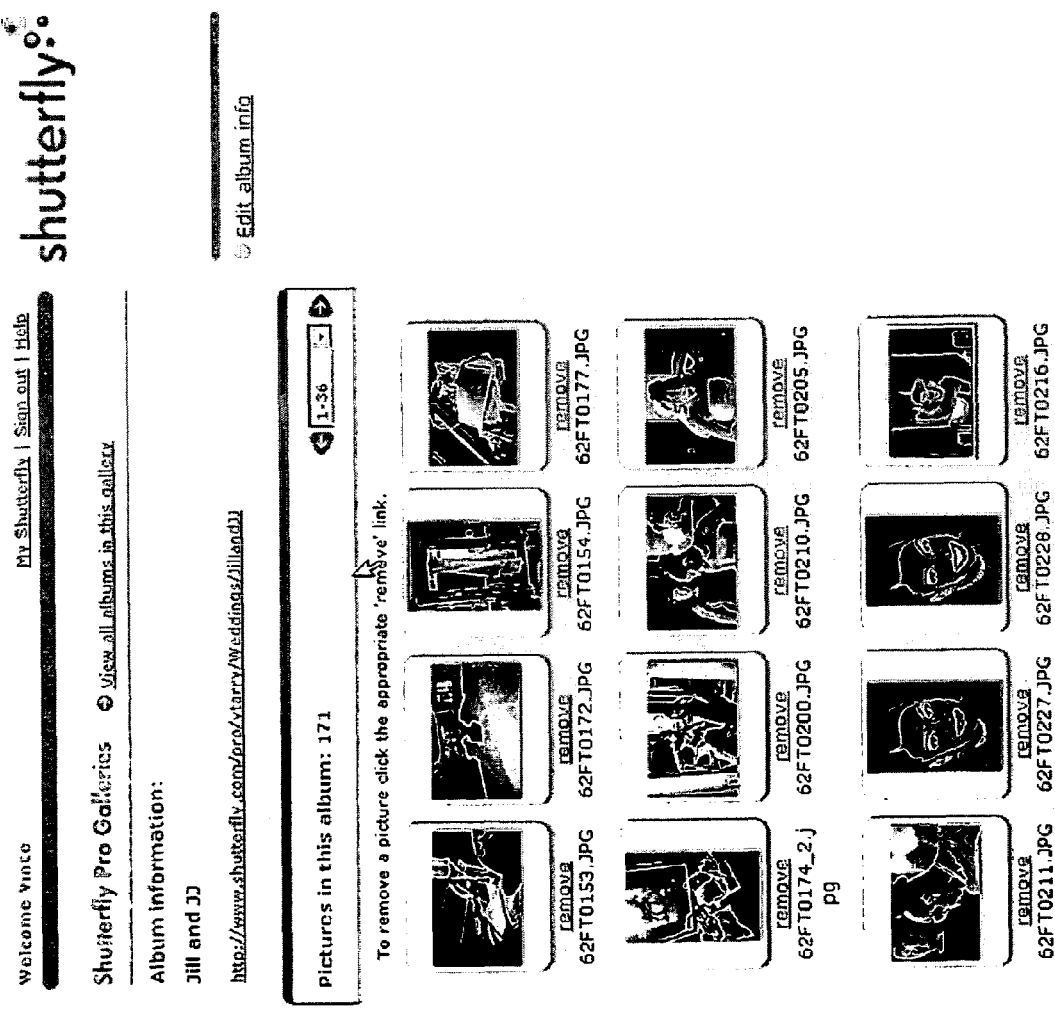

FIG. 4a-c illustrates web user interfaces for the professional photographer to organize the copyrighted digital images and enter pricing information for image-based products in a professional photo gallery.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
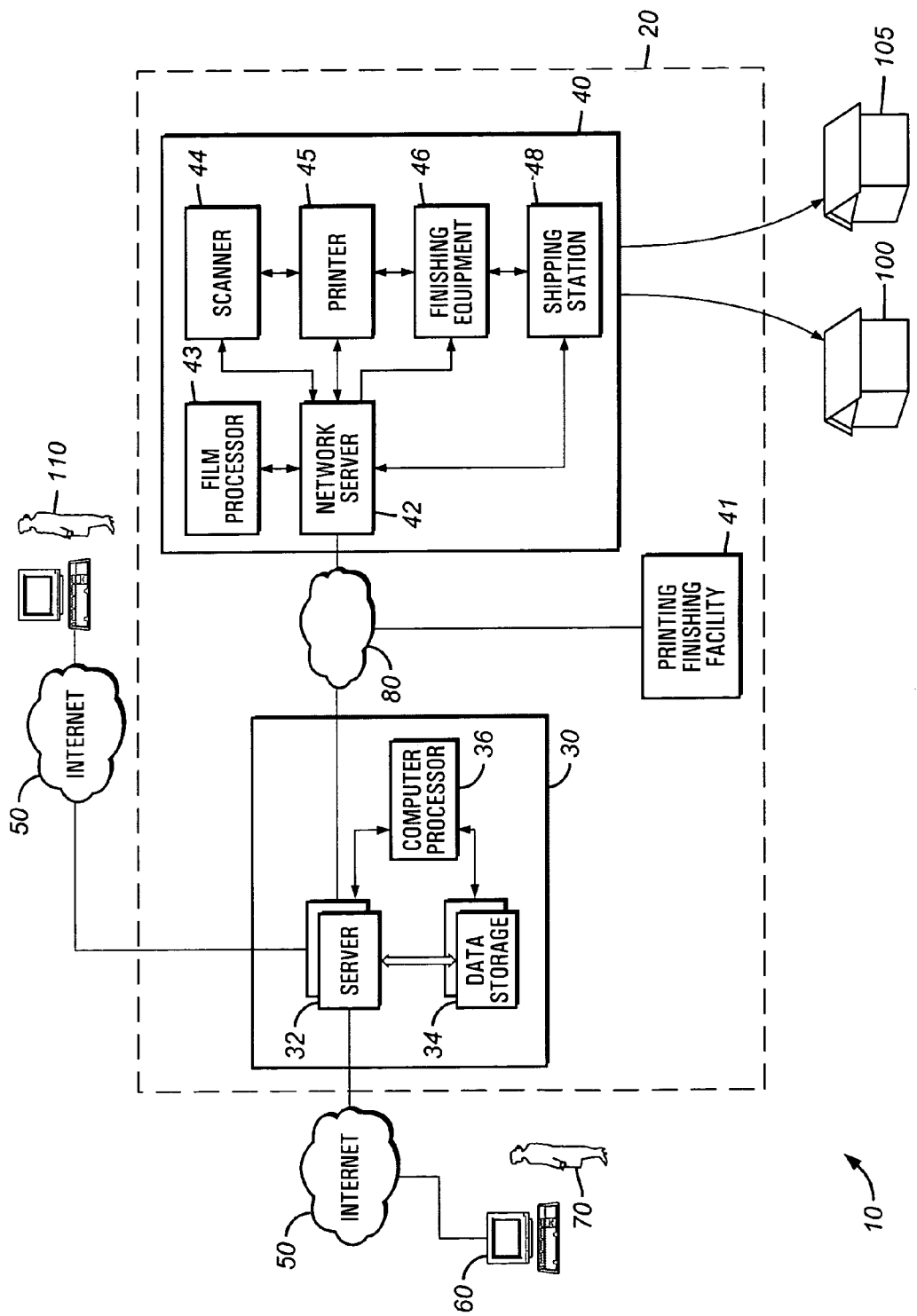
FIG. 1 is a block diagram including an automated printing system for producing copyright protected image-based products in accordance with the present invention.

FIG. 1 shows a block diagram of the photo fulfillment system 10 for producing image-based products in accordance with the present invention. An automated printing system 20 is established by a photo service provider such as Shutterfly, Inc. (located at Redwood City, Calif.) to provide photo services over a wide area network such as the Internet 50. The automated printing system 20 includes a data center 30 and one or more printing and finishing facilities 40 and 41. The data center 30 includes one or more servers 32, data storage devices 34 for storing image data, user account and order information, and one or more computer processors 36 for processing orders and rendering digital images.

A photo website is powered by the servers 32 to serve as a web user interface between the professional photographer 70 or his or her custom 110 and the photo service provider. As described in more details in relation to FIG. 3, the professional photographer 70 can conveniently provide his or her copyrighted digital images to the photo service provider, organize the copyrighted digital images at a web user interface and make the copyrighted digital images accessible to his or her customers 110. The customers 110 can view the copyrighted digital images at the web user interface and order image-based products using the copyrighted digital images. The printing and finishing facilities 40,41 produce the ordered image-based products. The architecture of the data storage devices 34 is designed to optimize the data accessibility, the storage reliability and the cost. Further details on the image data storage in automated printing system 20 are provided in the commonly assigned and above referenced U.S. patent application Ser. No. 09/428,871 filed Oct. 27, 1999, titled "Multi-tier Data Storage System", which is incorporated herein by reference.

In accordance to the present invention, image-based products include photographic prints, greeting cards, greeting cards, photo books and albums, poster images, framed photo prints, photo calendars, photo books, photo T-shirt, photo coffee mugs, CDs or DVDs containing recorded images, mouse pads, key-chains, or any other type of photo gift or photo novelty items. The greeting cards include folded greeting cards, postcards, note cards, trading cards, playing cards, and other form of cards. In the present invention, the professional photographer refers to someone who takes pictures at various events such as sport activities, concerts, graduations, church activities, weddings, or at a studio etc., and provides the captured images and associated image-based products to people who are interested in the events. The professional photographer or the organizer of the events typically owns the copyrights of the captured images. In the present invention, the people who purchase or use the image-based products and related services are referred as customers of the professional photographer.

The printing and finishing facilities 40,41 can be co-located at the data center 30 or at a remote location away from the data center 30. To shorten order delivery time, multiple printing and finishing facilities 40,41 can be distributed to be geographically close to large populations of customers. Furthermore, the printing and finishing facilities 40,41 and the data center 30 can be owned and operated by different business entities. For example, the data center 30 can be owned by a first business entity that hosts a website and provides a web user interface for the professional photographer 70 and the customers 110. The printing and finishing facilities 40,41 can be owned by a second business entity that fulfills the image-based product orders that are received from the data center 30. In latter arrangement, the second business entity may be referred as an Application Service Provider (ASP).

The printing and finishing facility 40 includes network servers 42 for communicating with the data center 30, printers 45 for printing images on physical surfaces, finishing equipment 46 for operations after the images are printed, and shipping stations 48 for confirming the completion of the orders and shipping the ordered image-based products to recipients 100 and 105. The recipients 100 and 105 can be the customer 110 who order image-base product or other people who are interested in the associated photo events. The printers 45 receive digital image data as input and reproduce images on physical receivers. Examples of printers 45 include digital photographic printers such as Fuji Frontier Minilab printers, Kodak DLS minilab printers, Noritsu digital photo printer, or Kodak I-Lab photo printers. The printers 45 also include digital offset printers or digital printing presses such as HP Indigo 9100 digital printing press, Xerox's DocuColor printers, as well as large format photo printers (available from Durst Dice America, Polielettronica, etc.), or large format inkjet printers (available from HP, Epson, etc.) for printing posters and banners.

The printing and finishing facilities 40,41 can include a film processor 43 for processing exposed films, and a scanner 44 for digitizing a processed film stripe. The network servers 42 are connected with the data center 30 via a computer network 80 such as a Local Area Network or a Wide Area Network. The order information and image data can be transferred from servers 32 to the network servers 42 using a standard or a proprietary protocol (FTP, HTTP, among others). After printing, the image-based products are finished by the finishing equipment 46 in finishing operations such as cutting, folding, adding a cover to photo book, punching, stapling, gluing, binding, envelope printing and sealing, packaging, labeling, weighing and postage metering. The finishing operations can also include framing a photo print, recording image data on a CD-ROM, etc. The finishing operations can occur at a different site from the printers 45. The finished orders of image-based products are shipped at the shipping station 48. The shipping completion is confirmed by scanning bar-codes on the shipping envelops and the shipping status is updated in database stored at data storage 34.

Figure 2:
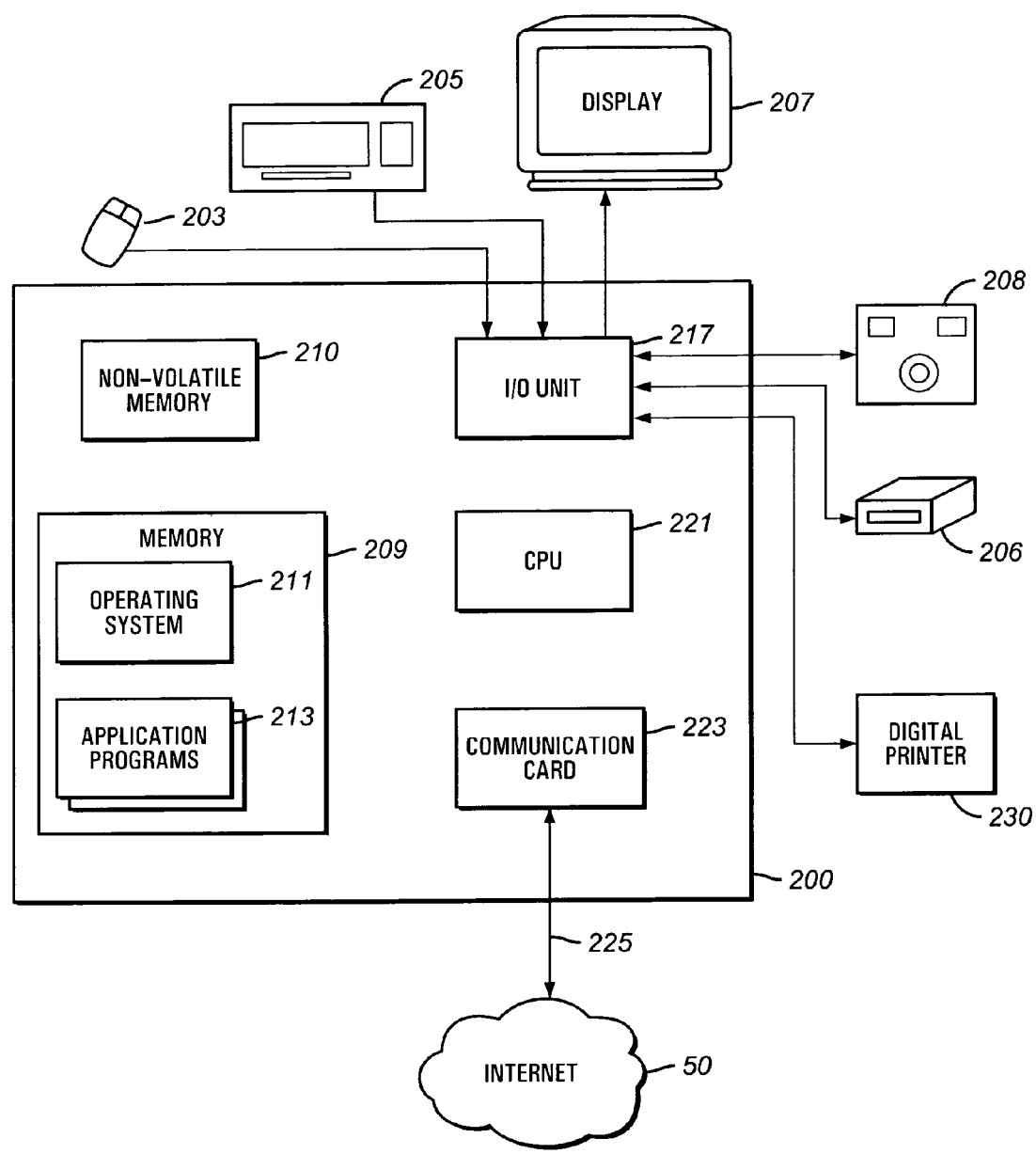
FIG. 2 shows a typical computer that a customer uses for receiving digital image data from a digital image capture device and for accessing a photo hosting website on the Internet.

The professional photographer 70 can access the online-photo website using a computer terminal 60 as shown in FIG. 2. The computer terminal 60 can be a personal computer located at a home or at a business, or a public entry terminal such as a kiosk. The computer terminal 60 allows the professional photographer 70 to execute software to perform tasks such as communicating with other computer users, accessing various computer resources, and viewing, creating, or otherwise manipulating electronic content, that is, any combination of text, images, movies, music or other sounds, animations, 3D virtual worlds, and links to other objects. Exemplary components of the computer terminal 60, shown in FIG. 2, include input/output (I/O) devices (mouse 203, keyboard 205, display 207) and a general purpose computer 200 having a central processor unit (CPU) 221, an I/O unit 217 and a memory 209 that stores data and various programs such as an operating system 211, and one or more application programs 213 including applications for viewing, managing, and editing digital images (e.g., a graphics program such as Adobe Photoshop). The computer 200 also includes non-volatile memory 210 (e.g., flash RAM, a hard disk drive, and/or a floppy disk, CD-ROM, DVD, or other removable storage media) and a communications device 223 (e.g., a modem, network adapter, or wireless communication device) for exchanging data with Internet 50 via a communications link 225 (e.g., a telephone line, cable, or wireless network).

The computer 200 of FIG. 2 can be connected to various peripheral I/O devices such as an image capture device (digital camera, film scanner or reflective scanners). One such peripheral device is a digital camera 208 that enables users to take pictures and save them in digital (electronic) format. Typically, the digital camera 208 is connected to the computer 200 only while the user is transferring images to the computer's disk drive or other non-volatile memory 210. The digital camera 208 can be connected to the computer 200 using a Firewire or an USB port, from a camera cradle (e.g. Kodak DX3900 using an EasyShare Camera Dock), or over wireless media such as radio or optical medium. The digital images captured by a digital camera are typically stored in memory card (e.g., SmartMedia™ or CompactFlash™) that are detachable from the digital camera. The digital images on a memory card can be transferred to the computer 200 using a card reader 206 and saved on non-volatile memory 210.

Once the digital images are stored on the computer 200, the professional photographer 70 can perform various operations on them using application programs 213 stored in memory 209. For example, an image viewer application can be used for viewing the images and a photo editor application can be used for touching up and modifying the images. Digital images can also be created or edited using an application program 213 (e.g., a graphics program such as Adobe Photoshop).

Figure 3:
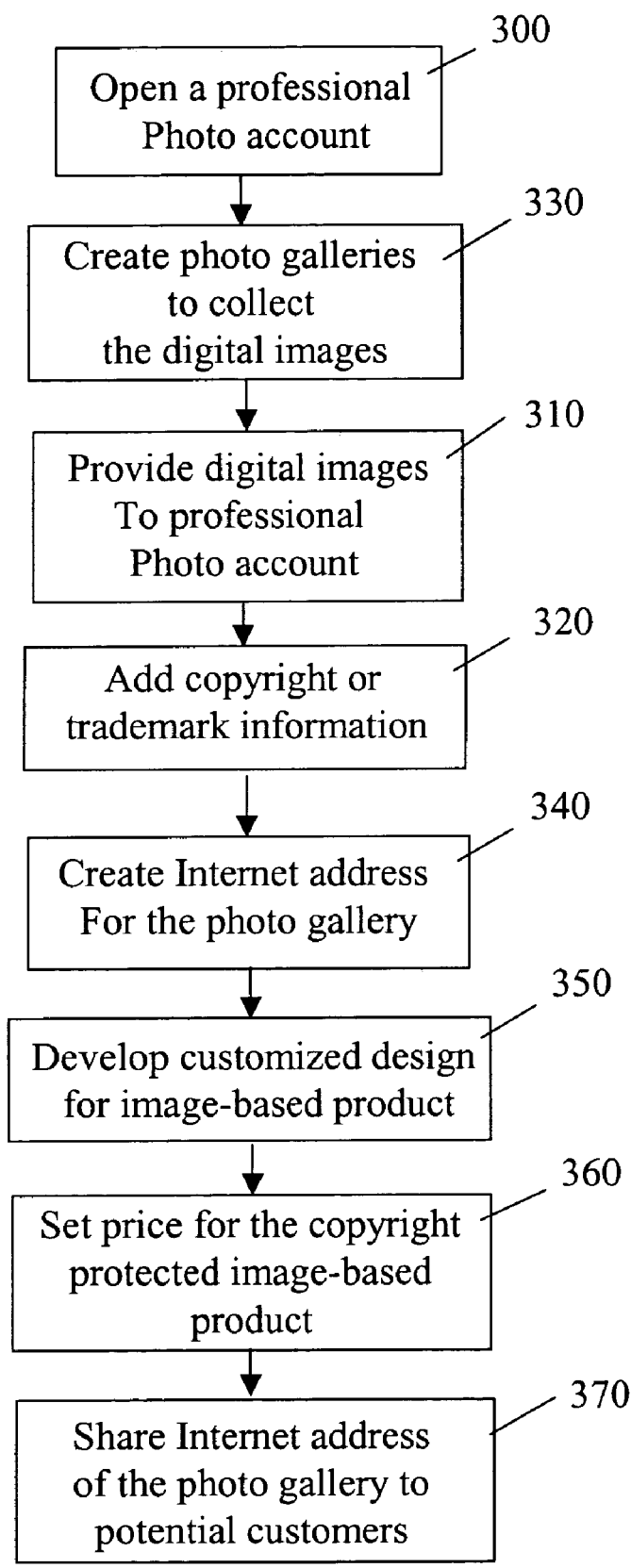
FIG. 3 is a flow diagram for providing image-base products based on copyrighted digital images in accordance to one embodiment of the present invention.
Figure 3:
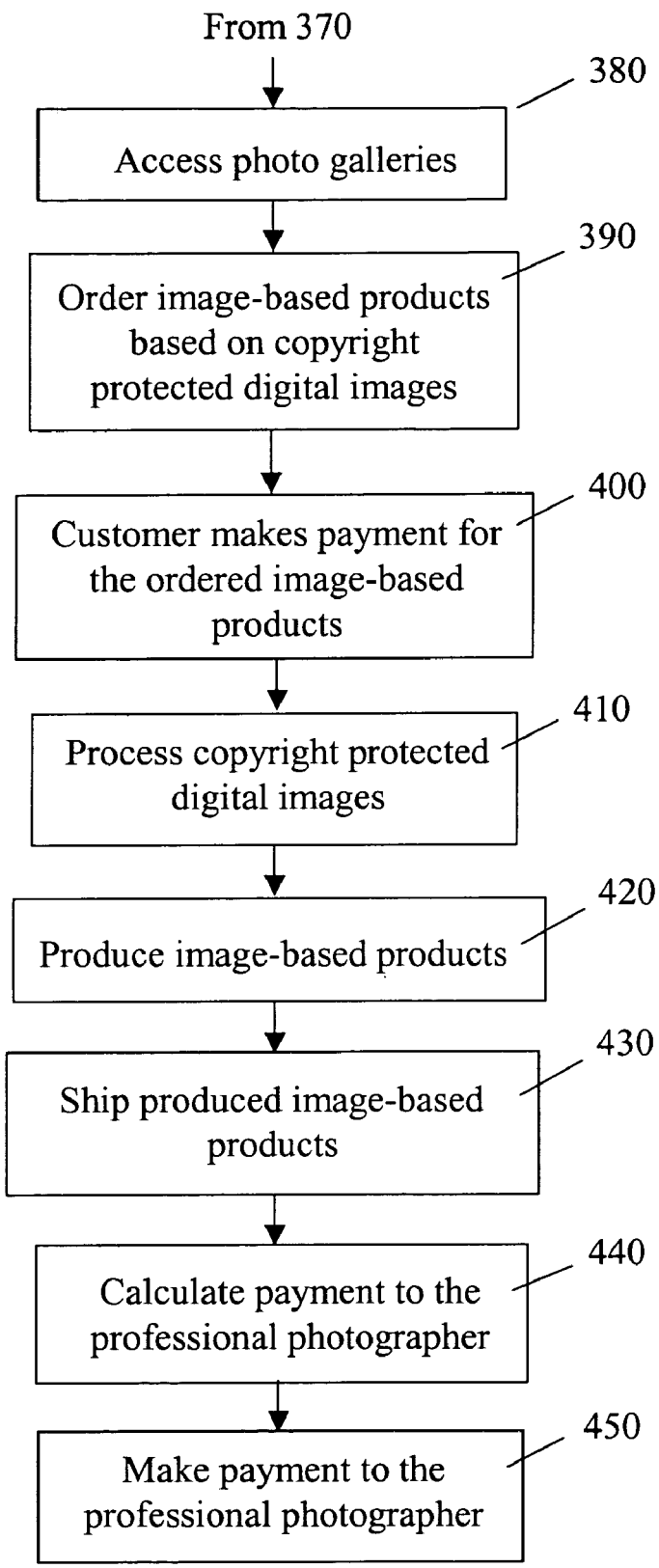

Details of the process of providing copyright protected image-based product are now described using the flow diagram illustrated FIG. 3. Using the communications card or device 223 in the computer 200, the professional photographer 70 connects to the online-photo website provided by a photo service provider such as www.shutterfly.com. The professional photographer 70 signs up for a professional photo account (box 300). An example of the professional photo account is the Pro Galleries™ provided by Shutterfly, Inc, located at Redwood City, Calif. The professional photographer 70 enters user information such as the photographer's name, address, and payment information including credit card information and auto bank transfer information. Several programs may be offered depending on the extent of the services the professional photographer 70 needs.

The terms of the professional photo account may include the charge of annual fees and image storage based on the size of the storage space requested. The terms of the professional photo account also include a fee for each image-based product that the photo service provider charges the professional photographer 70 when the customer 110 of the professional photographer 70 purchases the image-based product. The fee may depend on each image-based product as well as on the selling price (e.g. proportional to) that the professional photographer sets for his or her customers (see below).

The professional photographer 70 takes pictures at events such as sport activities, concerts, graduations, church activities, wedding, or at a studio, typically using a high-quality digital camera. The digital images are usually protected by copyright, owned by the professional photographer 70 or the organizers of the events. The professional photographer 70 can also obtain digital images from photographic media including photographic films and reflective prints. The images on the photographic media can be digitized using a film scanner or a reflective scanner that are connected to the computer 200.

Once the images are in digital form, the professional photographer 70 can send the digital image data to the online photo website and store the digital images in his or her professional photo account. Professional photo galleries will first be set up by the professional photographer 70 in his or her account (box 310). A professional photo gallery includes a collection of copyright protected digital images that are usually captured at one event and/or of interest to one group of customers 110. Examples of the professional photo galleries are the Pro Galleries™ programs provided by Shutterfly, Inc. at "www.shutterfly.com". Each professional photo gallery is stored in data storage 34 and is assigned by an Internet Address (e.g. Uniform Resource Locator) (box 340). The professional photographer 70 organizes the copyright protected digital images in the professional photo galleries that may include Wedding, Baseball, Soccer league, graduation, etc. Each gallery may include several albums. For example, there may be several albums under the 'Wedding' gallery, and albums for different leagues and individual games under the "Baseball" gallery. The professional photographer 70 can add personalized designs, business logo and copyright information on web user interface (e.g. web pages) presenting his or her professional photo galleries.

After the proper galleries and albums are set up in the professional photographer 70's account, digital images can be provided to be stored in the galleries and albums. The digital images can be uploaded over the Internet 50 using a standard or a proprietary protocol (FTP, HTTP, XML, for example) or electronic communication application (for example, e-mail or special-purpose software provided by the photo-finisher). A web user interface with an optional client software application can also be used to assist the image uploads. Details of web user interface for image uploading are disclosed in the commonly assigned and above referenced U.S. patent application Ser. No. 09/450,804, filed on Nov. 29, 1999, titled "Image Uploading", the disclosure of which is incorporated herein by reference. The professional photographer 70 can also mail digital image data stored on a physical storage medium such as a memory card or recordable CD to the photo service provider.

If the professional photographer 70 takes pictures at events using traditional film cameras, he or she can send the exposed films to printing and finishing facility 40 where the exposed films are processed (a film processor 43) and digitized to produce digital images (by scanner 44). The digital image data obtained are then stored in data storage 34 and accessible in the professional's photo account. The processed films and the digital image files can subsequently be sent back to the professional photographer 70.

The professional photographer 70 can view, edit, and manipulate (e.g. rendering, cropping, color and tone changes, etc.) the copyrighted digital images in the professional photo galleries. The professional photographer 70 can also add copyright and/or trademarks to each professional digital image. The copyright and trademark messages can be printed on the back of the photographic prints, annotated or embedded in the front of the copyrighted image-based product (box 330). Details of digital image manipulations and image annotations and backprinting messages at a web user interface are disclosed in the commonly assigned and above referenced U.S. patent application Ser. No. 09/450,899, filed on Nov. 29, 2000, titled "Backprinting Image Prints", U.S. patent application Ser. No. 09/721,484, filed on Nov. 22, 2000, titled "User Interface and Methods for On-line Print Service", U.S. patent application Ser. No. 09/560,609, filed on Apr. 28, 2000, titled "System and Method of Providing a User Interface for Changing Attributes of an Image-based Product", U.S. patent application Ser. No. 09/561,027, filed on Apr. 28, 2000, titled "System and Method of Cropping an Image", and U.S. patent application Ser. No. 9/972,602, filed on Oct. 5, 2000, titled "Managing and searching digital images". The disclosure of these above patent applications are incorporated herein by reference.

The professional photo galleries and albums can be public or private. After the galleries are created, the professional photographer 70 may decide to make it distributed to his or her customers 110, as described below, or keep it private to himself or herself. The private galleries can serve as an image-bank from which digital images can be selected for commercial use. Photo galleries containing sample images can also be provided to potential customers 110 or other professional photographers 70 for education about the services and the image-based products. Password protection can be applied to the professional photo galleries.

The professional photographer 70 can develop customized designs for each image-based product using the copyright protected digital images at the web user interface provided by the photo service provider (box 350). Shutterfly, Inc. for example, provides these customized design capabilities. At the website www.shutterfly.com, the professional photographer 70 can design a customized (or personalized) photo calendar, customized photo greeting card, a customized photo Snapbook, or a customized photo album using the copyright protected digital images. For example, a customized photo calendar may be designed for a wedding. Copyright protected digital images are used for the cover image and for each month. Personalized events such as engagement and wedding anniversary can also be printed in the boxes of the corresponding dates. In another example, a plurality of customized designs can be developed for photo Snapbooks for a sport event. The customers 110 can choose their preferred designs when they purchase the snapbooks. The designs of these customized image-based products are saved in the professional photo galleries and accessible at an Internet address.

In the present invention, the term "customized" refers to "individualized" or "personalized" image-related information, messages, designs, and services that are specific to the recipient, the customer, the image-based product, the intended occasion or service. Details of designing customized image-based products are disclosed in the commonly assigned and above referenced U.S. patent application Ser. No. 09/560,609, filed on Apr. 28, 2000, titled "System and Method of Providing a User Interface for Changing Attributes of an Image-based Product", U.S. patent application Ser. No. 09/561,027, filed on Apr. 28, 2000, titled "System and Method of Cropping an Image", U.S. patent application Ser. No. 09/684,595, filed on Oct. 5, 2000, titled "Previewing a framed image print ", U.S. patent application Ser. No. 9/972,602, filed on Oct. 5, 2000, titled "Managing and searching digital images", U.S. patent application Ser. No. 10/106,902, filed on Mar. 25, 2002, titled "Producing and sharing personalized photo calendar", U.S. patent application Ser. No. 10/185,862, filed Jun. 28, 2002, titled "Personalized photo greeting cards", and U.S. patent application Ser. No. 10/287,279, filed Nov. 3, 2002, titled "Producing personalized photo calendar". The disclosure of the above U.S. patent applications are incorporated herein by reference.

In accordance with the present invention, the professional photo account provides each professional photographer 70 the flexibility to set a selling price on each of the copyrighted image-based products for the copyright digital images in each professional photo gallery (box 360). As seen below, the selling price is the price that the customers 110 pay when they purchase the image-based products based on the copyright protected digital images. The selling price may be required to be higher than the fee that the photo service provider charges the professional photographer 70 on each sale of image-based product. The selling price for the image-based products can vary between different photo galleries (each typically holding digital images from a separate photo event). For example, the photo service provider may charge the professional photographer $10 for each 11"×14" print. The professional photographer may sell the 11"×14" print at $12.00 if it is reproduced from an image in one photo gallery, and at $15.00 if it is reproduced from an image from a different photo gallery. The flexible pricing structure is valuable to the professional photographers 70 because of their needs of dynamically pricing image-based products in different events or different segments of market. For example, the professional photographers 70 may want to charge a higher price per image-based product for the events where they invested more time and resources. The work involved includes set-up work and photo taking at the scene of the events, as well as the subsequent image editing, image rendering, and the design work on the local computer 200 or at a web user interface. Furthermore, the pricing may vary according to nature of the events (sports, weddings vs. church or charity events) and the number of potential customers for each event (the fixed costs are shared by the total number of customers).

After the professional photographer 70 opens his or her account under Pro Galleries™ at www.shutterfly.com, he or she can create a new gallery at a web page as illustrated in FIG. 4a. The professional photographer 70 chooses a gallery name (e.g. "Weddings") and gallery title (e.g. "Vince Tarry Wedding Photography"), and enters a description for the gallery. A password can be set for the distribution of the copyright protected images in the gallery. Prices can be set for different print formats 4×6, 5×7, 8×10, wallet-size prints, 11"×14", 16"×20" and 20"×30" etc. Other image-based products available may include calendars, greeting cards, Snapbook, etc. A minimum price may be required by the photo service provider.

A gallery can include several albums. The "Weddings" gallery, shown in FIG. 4b, includes three albums hosting images captured from three different weddings. Furthermore, each album can also include customized designs of image-based products.

Each album can be viewed at an assigned Internet addresses as shown in FIG. 4c. Each abum may be viewed in a plurality of album pages. The professional photographer 70 can add, edit, and remove the copyrighted images in each album.

The professional photographer 70 shares the Internet addresses of the albums or the galleries with his or her customers 110 (box 370). These Internet addresses can be shared to potential customers 110 via e-mail, a hypertext link on the professional photographer's website and so on. Password protection can be applied to the photo galleries and the designs. When the photo galleries are protected by passwords, the professional photographer 70 gives authorization to the customers 110 to access the shared photo galleries.

The customer 110 accesses the photo galleries at the Internet addresses provided by the professional photographer (box 380), which may be from a home computer and a public entry terminal such as a kiosk. Similar to the album pages viewable to the professional photographer 70, the customers 110 can view the copyright protected digital images online using a web browser in screen or thumbnail resolutions. The customers 110, however, cannot edit or change the copyrighted digital images in the albums. For copyright protection purpose, the copyright protected digital images are not available in the full resolution to the customers 110.

The customer 110 orders an image-based product by selecting the copyright protected digital images in the photo galleries to be used in the image-based product (box 390). The customer 110 can select a design previously developed by the professional photographer 70 for the particular image-based product. The customer 110 also specifies the number of copies for each image-based product, and one or more recipients 100,105 to whom image-based products should be shipped. The selling prices listed for the image-based products are as provided by the professional photographer 70, as described above. As described above, this selling price may vary among photo galleries and between professional photographers even for the same type of image-based product. The customer 110 completes the order by making payment at the selling price specified by the professional photographer 70 for that gallery (400). The server 32 is in communication with a payment authorization center for automated fund transfers.

Once the order is completed, the full-resolution of the copyright protected digital images are processed by computer processor 36 in preparation for printing on the printer 45 (box 410). The processing operations can include color or tone calibrations, resizing, cropping, sharpening, image embedding or superimposing based on the design of image-based product provided by the professional photographer 70.

The image-based products are printed by the printer 45 and finished by finishing equipment 46 according to the printing parameters as specified by the customer 110 (box 420). The image-based products are then delivered to the specified recipients 100, 105 using standard U.S. Mail, or courier services such as Federal Express or UPS (box 430). Further details about the generation and distribution of image-based products using automated printing system 20 are provided in the above referenced and commonly assigned U.S. patent application Ser. No. 09/436,704, filed on Nov. 9, 1999, titled "Distributing Images to Multiple Recipients", U.S. patent application Ser. No. 09/450,075, filed on Oct. 27, 1999, titled "Printing Images in an Optimized Manner", and U.S. patent application Ser. No. 10/287,279, filed Nov. 3, 2002, titled "Producing personalized photo calendar". The disclosures of these patent applications are herein incorporated by reference.

After the order is shipped, the computer processor 36 computes the amount of payment to the professional photographer as a result of the sale (box 440). The sales revenue is subtracted by the shipping charge, tax, and the fee charged by the photo service provider as agreed in the terms of the professional photo account. Proper payment or credit are be made by the photo service provider to the professional photographer based on the results of the computation (box 450).

A number of embodiments have been described. Nevertheless, it will be understood that various modifications may be made without departing from the spirit and scope of the invention. For example, advantageous results still could be achieved if steps of the disclosed techniques were performed in a different order and/or if components in the disclosed systems were combined in a different manner and/or replaced or supplemented by other components. Accordingly, other embodiments are within the scope of the following claims.

ELEMENT NUMBER LIST 10 photo fulfillment system
20 automated printing system
30 data center
32 server
34 data storage devices
36 computer processor
40 printing and finishing facility
41 printing and finishing facility
42 network server
43 film processor
44 scanner
45 printer
46 finishing equipment
48 shipping station
50 internet
60 computer terminal
70 professional photographer
80 computer network
100 recipient
105 recipient
110 customer
200 computer
203 mouse
205 keyboard
206 card reader
207 computer display
208 digital camera
209 memory
210 non-volatile memory
211 operating system
213 application program
217 I/O unit
221 central processing unit (CPU)

223 communication device
225 communications link
230 digital printer
300 open a professional account
310 create photo galleries to collect the digital images
320 provide digital images to professional photo account
330 add copyright or trademark information
340 create Internet address for the photo gallery
350 develop customized design for image-based product
360 set price for copyright protected image-based product
370 share Internet address of the photo gallery to potential customers
380 customers access photo galleries
390 order image-based products based on the copyright protected digital images
400 customer makes payment for the ordered image-based products
410 process copyright protected digital images
420 produce image-based products
430 ship produced image-based products
440 calculate payment to the professional photographer
450 make payment to the professional photographer

What is claimed is:

1. An automated printing system for producing image-based products of a common product type from a user account, comprising:
    a server computer configured to receive:
        a first gallery of one or more copyright protected digital images and a first price for a first image-based product incorporating a copyright protected image in the first gallery, wherein a first user owns copyrights of the one or more copyright protected digital images in the first gallery;
        a second gallery of one or more copyright protected digital images and a second price for a second image-based product incorporating a copyright protected image in the second gallery, wherein the first user owns copyrights of the one or more copyright protected digital images in the second gallery, wherein the first image-based product and the second image-based product belong to a common product type, and wherein the first price is different from the second price;
        a first order of the first image-based product incorporating the copyright protected image in the first gallery, wherein the first order is received from a second user; and
        a second order of the second image-based product incorporating the copyright protected image in the second gallery, wherein the second order is received from a third user;
    a computer processor configured to process a copyright protected digital image in the first gallery in response to the first order and to calculate payment to the first user based on the first price, and to process a copyright protected digital image in the second gallery in response to the second order and to calculate payment to the first user based on the second price; and
    a digital printer coupled to the computer processor and configured to produce the first image-based product or the second image-based product.

2. The automated printing system of claim 1, wherein the first user is a owner of the user account.

3. The automated printing system of claim 1, wherein the computer processor is configured to insert a copyright message to at least one of the copyright protected digital images in the first gallery or in the second gallery.

4. The automated printing system of claim 1, wherein the copyright protected digital images in the first gallery is accessible at an Internet address by a second user and the copyright protected digital images in the second gallery are accessible at the Internet address by a third user.

5. The automated printing system of claim 1, wherein the first price and the second price are entered or changed by the first user at a web user interface.

6. The automated printing system of claim 1, wherein the first gallery is accessible to the second user but not to the third user and the second gallery is accessible to the third user but not to the second user.

7. The automated printing system of claim 1, wherein the server computer is configured to share the first gallery to the second user via a computer network.

8. The automated printing system of claim 1, wherein the image-based product includes one selected from the group consisting of photographic prints, photo calendars, photo greeting cards, photo snapbook, and photo album.

9. The automated printing system of claim 1, wherein the first order is received from a second user over a computer network.

10. A system for providing image-based products of a common product type from a user account, comprising:
    a server computer configured to receive:
        a first gallery of one or more copyright protected digital images and a first price for a first image-based product incorporating a copyright protected image in the first gallery, wherein a first user owns copyrights of the one or more copyright protected digital images in the first gallery;
        a second gallery of one or more copyright protected digital images and a second price for a second image-based product incorporating a copyright protected image in the second gallery, wherein the first user owns copyrights of the one or more copyright protected digital images in the second gallery, wherein the first image-based product and the second image-based product belong to a common product type, and wherein the first price is different from the second price;
        a first order of the first image-based product incorporating the copyright protected image in the first gallery, wherein the first order is received from a second user; and
        a second order of the second image-based product incorporating the copyright protected image in the second gallery, wherein the second order is received from a third user;
    a computer storage device configured to store a user account owned by the first owner and to store first gallery and the second gallery in the user account, wherein the first gallery is accessible to the second user but not to the third user and the second gallery is accessible to the third user but not to the second user; and
    a computer processor configured to process a copyright protected digital image in the first gallery in response to the first order and to calculate payment to the first user based on the first price, and to process a copyright protected digital image in the second gallery in response to the second order and to calculate payment to the first user based on the second price.

11. The system of claim 10, wherein the first user is a owner of the user account.

12. The system of claim 11, wherein the first price and the second price are entered or changed by the first user at a web user interface.

13. The system of claim 10, wherein the server computer is configured to share the first gallery to the second user via a computer network.

14. The system of claim 10, wherein the first gallery and the second gallery of one or more copyright protected digital images are uploaded by the first user to the server computer over a computer network.

15. The system of claim 10, wherein the computer processor is configured to insert a copyright message to at least one of the copyright protected digital images in the first gallery of the second gallery.

* * * * *